US010150429B2

(12) United States Patent
Takezawa (10) Patent No.: US 10,150,429 B2
(45) Date of Patent: Dec. 11, 2018

(54) VEHICLE

(71) Applicant: HONDA MOTOR CO., LTD., Tokyo (JP)

(72) Inventor: Tetsuya Takezawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/524,121

(22) PCT Filed: Oct. 22, 2015

(86) PCT No.: PCT/JP2015/079878
§ 371 (c)(1),
(2) Date: May 3, 2017

(87) PCT Pub. No.: WO2016/076097
PCT Pub. Date: May 19, 2016

(65) Prior Publication Data
US 2017/0327058 A1 Nov. 16, 2017

(30) Foreign Application Priority Data

Nov. 11, 2014 (JP) ................................. 2014-229001

(51) Int. Cl.
*B60R 13/08* (2006.01)
*B60K 1/04* (2006.01)
(Continued)

(52) U.S. Cl.
CPC ..... *B60R 13/0884* (2013.01); *B60H 1/00278* (2013.01); *B60K 1/04* (2013.01); *B60R 7/04* (2013.01); *B60R 7/043* (2013.01); *B60R 13/0815* (2013.01); *B60R 13/0823* (2013.01); *B60R 13/0876* (2013.01); *B60H 1/00535* (2013.01); *B60H 2001/003* (2013.01);
(Continued)

(58) Field of Classification Search
CPC ............... B60R 13/0884; B60R 7/043; B60R 13/0823; B60R 7/04; B60R 13/0815; B60R 13/0876; B60K 1/04; B60H 1/00278
USPC .................................... 296/37.8, 24.34, 39.3
See application file for complete search history.

(56) References Cited

U.S. PATENT DOCUMENTS 8,474,897 B1 * 7/2013 Jackson .................... B60R 7/04
296/24.34
2002/0168492 A1 11/2002 Madono et al.

FOREIGN PATENT DOCUMENTS

JP       2003-266572 A     9/2003
JP       2008-254607 A    10/2008
(Continued)

OTHER PUBLICATIONS

International Search Report dated Dec. 15, 2015, issued in counterpart International Application No. PCT/JP2015/079878, w/English translation (4 pages).
(Continued)

*Primary Examiner* — Joseph D. Pape
(74) *Attorney, Agent, or Firm* — Westerman, Hattori, Daniels & Adrian, LLP (57) ABSTRACT

A vehicle includes: an electric device; a left front seat and a right front seat; and a center console which is disposed between the left front seat and the right front seat, and which accommodates the electric device. A sheet-like soundproofing member is disposed between an upper surface of the electric device and the center console.

7 Claims, 7 Drawing Sheets

(51) Int. Cl.
  *B60R 7/04* (2006.01)
  *B60H 1/00* (2006.01)
  *B60K 1/00* (2006.01)

(52) U.S. Cl.
  CPC ............... *B60H 2001/00228* (2013.01); *B60K 2001/005* (2013.01); *B60K 2001/0427* (2013.01)

(56) References Cited

FOREIGN PATENT DOCUMENTS

| | | |
|---|---|---|
| JP | 2008-293853 A | 12/2008 |
| JP | 2010-129349 A | 6/2010 |
| JP | 2012-148582 A | 8/2012 |
| JP | 2014-41724 A | 3/2014 |

OTHER PUBLICATIONS

Office Action dated Jan. 23, 2018, issued in counterpart Japanese Application No. 2016-558954, with English machine translation. (8 pages).

* cited by examiner

VEHICLE

TECHNICAL FIELD

The present invention relates to a vehicle and more particularly to a vehicle in which a center console which accommodates therein an electric device is disposed between front seats.

BACKGROUND ART

In a hybrid electric vehicle or an electric vehicle, a high-voltage battery is mounted as a drive source for an electric motor. In recent years, it has been under study to dispose a high-voltage battery within a passenger compartment, and battery installation mechanisms have been proposed in which a high-voltage battery is disposed between a pair of seats which are aligned side by side in a left-right or transverse direction of a vehicle (for example, refer to Patent Literature 1). In the event that high-voltage electric equipment such as a high-voltage battery is disposed in a center console in the way described above, there are fears that noise generated from the high-voltage electric equipment is transmitted to a passenger.

In Patent Literature 1, an inner case making up a flow path of air which cools a battery is provided in an interior of a center console, and a noise absorbing material is provided on an interior surface of the inner case which lies opposite to an air intake port, whereby the generation of noise from high-voltage electric equipment is suppressed.

Additionally, in Patent Literature 2, a sheet-like soundproofing member is disposed between a high-voltage device which is disposed on a back side of a seat back and a storage portion of the seat back, whereby noise generated at the high-voltage device is prevented from being transmitted to a passenger.

PRIOR ART LITERATURE

Patent Literature

Patent Literature 1: JP-A-2008-293853
Patent Literature 2: JP-A-2012-148582

SUMMARY OF THE INVENTION

Problem that the Invention is to Solve

In the construction described in Patent Literature 1, however, since the noise absorbing material is built to the interior surface of the inner case, it becomes difficult to build the noise absorbing material, and there is still room for improvement in suppressing the noise to be transmitted to the passenger. In addition, the construction described in Patent Literature 2 is such that the high-voltage device is disposed on the back side of the seat back and is nothing like a construction in which the high-voltage device is disposed in a center console.

The invention provides a vehicle which can suppress transmitting a noise generated in an electric device which is disposed inside a center console to a passenger.

Means for Solving the Problem

The invention provides the following aspects.

According to a first aspect, there is provided a vehicle (for example, a vehicle 10 in an embodiment which will be described later) including:

an electric device (for example, an electric device D in the embodiment);

a pair of left front seat and right front seat (for example, a left front seat 14L and a right front seat 14R in the embodiment); and a center console (for example, a center console 30 in the embodiment) which is disposed between the left front seat and the right front seat, and which accommodates the electric device, wherein a sheet-like soundproofing member (for example, an upper soundproofing member 81 in the embodiment) is disposed between an upper surface of the electric device and the center console.

According to a second aspect, in the first aspect, the soundproofing member is made up by integrating or laminating a noise absorbing member and a heat insulating member.

According to a third aspect, in the first or second aspect, the electric device is held by a frame member (for example, a frame member 31 in the embodiment) having a rectangular parallelepiped shape and includes at least one of a high-voltage battery (for example, high-voltage batteries 32 in the embodiment) and a high-voltage system equipment (for example, high-voltage system equipment 35 in the embodiment), and the soundproofing member has projecting portions (for example, a front projecting portion 84F, a rear projecting portion 84B, a left projecting portion 84L and a right projecting portion 84R in the embodiment) which cover joint portions between an upper panel (for example, an upper frame member 31U in the embodiment) and side panels (for example, a front cover member 31F, a rear cover member 31B, a left cover member 31L and a right cover member 31R in the embodiment) which make up the frame member.

According to a fourth aspect, in the second aspect, an air conditioning duct (for example, an air conditioning duct 71 in the embodiment) which connects to an air conditioner is provided in the center console, and the air conditioning duct is provided above the soundproofing member.

According to a fifth aspect, in any one of the first to fourth aspects, other soundproofing members (for example, a left soundproofing member 82L and a right soundproofing member 82R in the embodiment) which are integral with or separate from the soundproofing member are disposed between a left side surface and the center console and between a right side surface of the electric device and the center console respectively.

Advantages of the Invention

According to the first aspect, since the sheet-like soundproofing member is disposed between the upper surface of the electric device and the center console, it is possible to suppress effectively transmitting noise generated in the electric device to a passenger. In addition, the sheet-like soundproofing member is easy to be handled and can hence be built on the upper surface of the electric device easily.

According to the second aspect, it is possible to suppress effectively transmitting the noise generated in the electric device and heat generated in the electric device to a passenger.

According to the third aspect, it is possible to shut noise of the electric device which leaks out from gaps in the joint portions of the frame member in an ensured fashion by covering joint portions between the upper panel and the side panels which make up the frame member with the sound proofing member.

According to the fourth aspect, a heat transmission between the air conditioning duct and the electric device can be suppressed by the soundproofing member, thereby making it possible to prevent condensation from occurring on the air conditioning duct.

According to the fifth aspect, it is possible to prevent transmitting noise generated on the periphery of the electric device to a passenger.

MODE FOR CARRYING OUT THE INVENTION

Hereinafter, a vehicle according to one embodiment of the invention will be described by reference to the drawings. The drawings should be seen in a direction in which given reference numerals look normal. In the following description, front, rear, left, right, up and down denote accordingly directions as seen from a driver of the vehicle. The front, rear, left, right, up and down sides of the vehicle are denoted by Fr, Rr, L, R, U and D, respectively.

Figure 1:
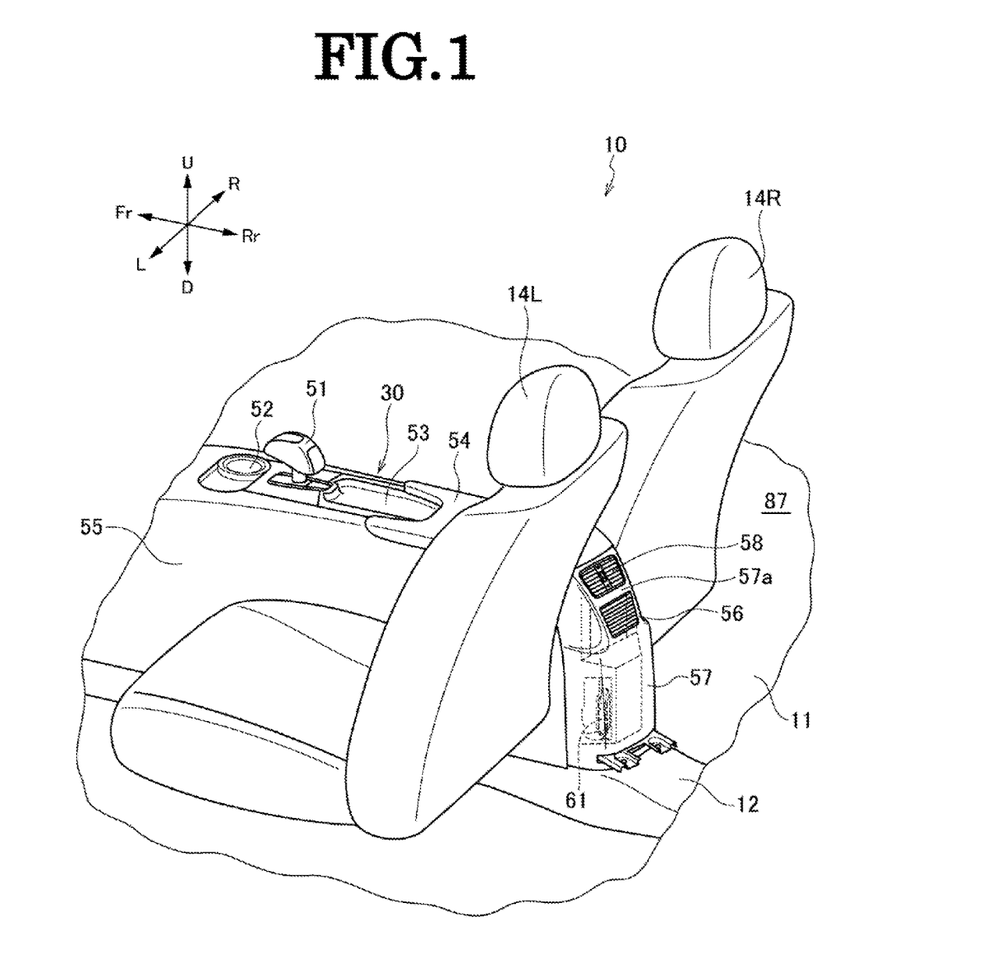
FIG. 1 is a perspective view showing front seats and a center console which is disposed between the front seats of a vehicle according to an embodiment of the invention.
Figure 2:
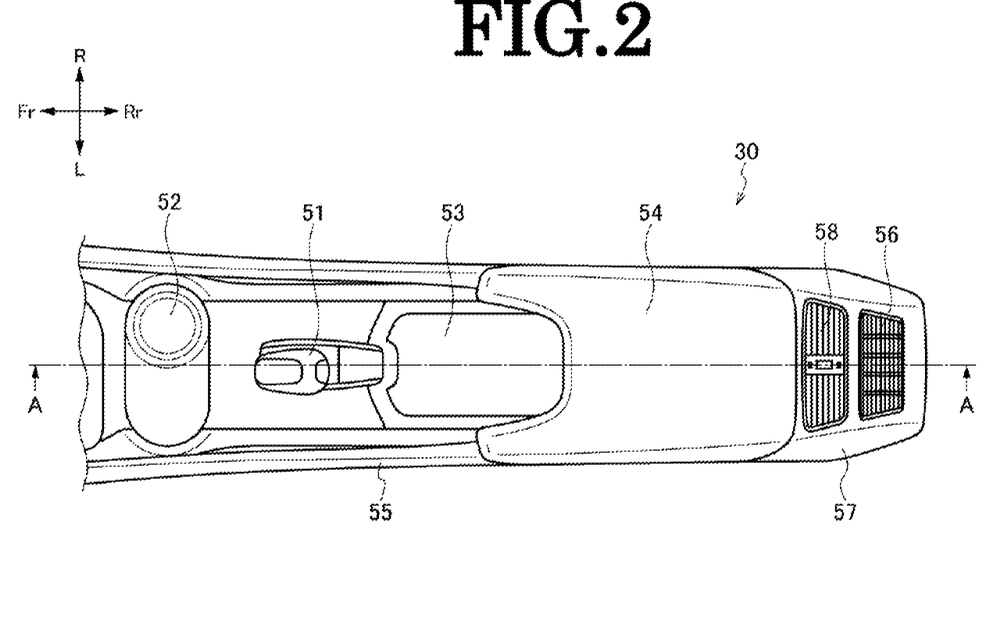
FIG. 2 is a plan view of the center console.
Figure 3:
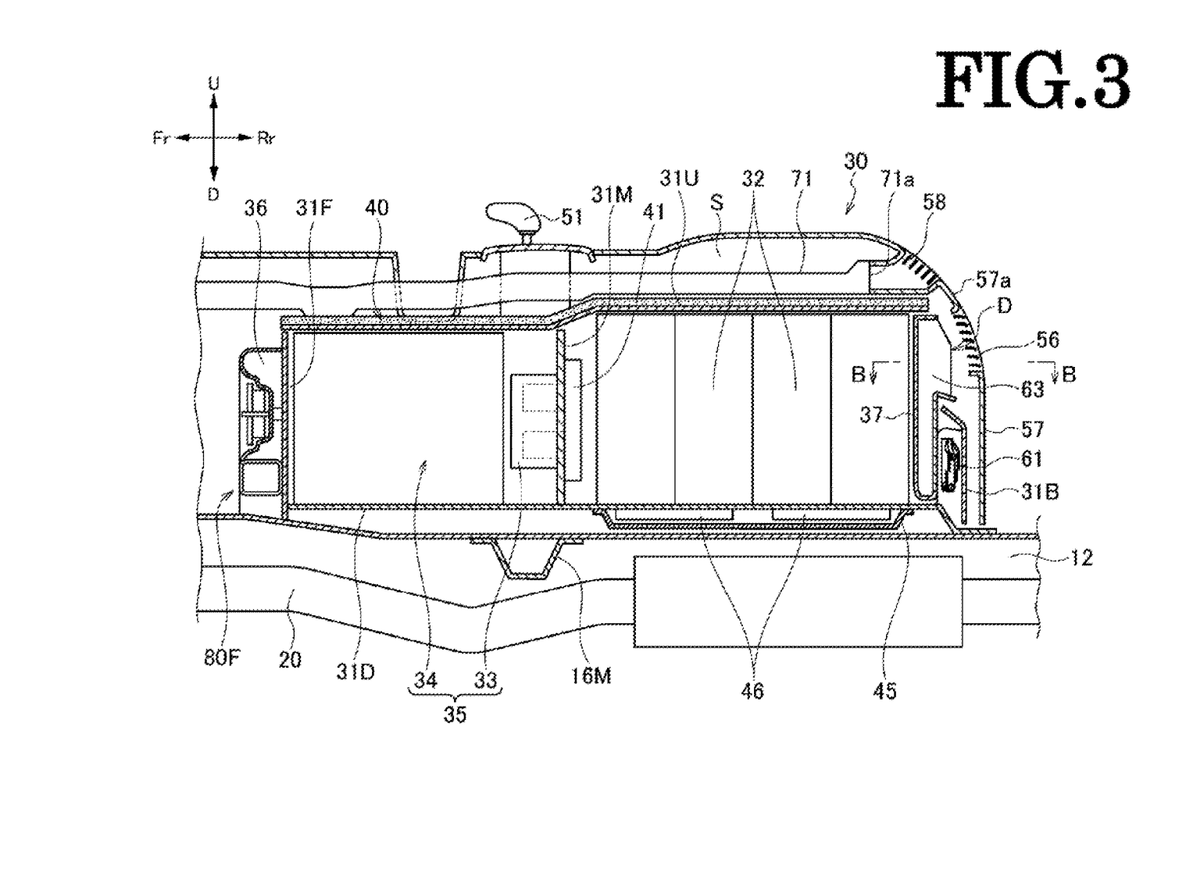
FIG. 3 is a partial sectional view taken along a line A-A in FIG. 2.

FIG. 1 is a perspective view showing front seats and a center console which is disposed between the front seats of a vehicle according to an embodiment of the invention, FIG. 2 is a plan view of the center console, and FIG. 3 is a partial sectional view of the center console.

As shown in FIGS. 1 to 3, in a vehicle 10 of this embodiment, a center console 30 is disposed on a center tunnel 12 formed on a floor panel 11, and an electric device D is accommodated in the center console 30. The center tunnel 12 is formed between a left front seat 14L and a right front seat 14R on the floor panel 11 so that a space having a substantially trapezoidal cross section extends in a front-rear direction. An exhaust pipe 20, which is connected to an internal combustion engine, not shown, at one end thereof, is provided in the center tunnel 12 (below the center tunnel 12) so as to extend in the front-rear direction. In FIG. 3, reference numeral 16M denotes a center cross member which reinforces the center tunnel 12.

<Center Console>

The center console 30 is disposed between the left front seat 14L and the right front seat 14R, and an interior space thereof is covered by an external cover 55 on an upper surface of which a cup holder 52, a shift knob 51, a small article storage tray 53 and an armrest 54 for front seat passengers are provided sequentially in that order from the front. A cover member 57 in which an intake grille 56 and an air conditioning discharge grill 58 are provided is attached to a rear end of the external cover 55. The cover member 57 has an inclined surface 57a which is inclined obliquely downwards from the front to the rear. The air conditioning discharge grill 58 is formed in an upper portion of the inclined surface 57a, and the intake grille 56 is formed below the air conditioning discharge grill 58. When a cooling fan 36, which will be described later, is activated, the intake grill 56 takes in air inside a passenger compartment 87 as cooling air for the electric device D. The air conditioning discharge grill 58 discharges cool air which is supplied from an air conditioner (not shown) provided at a front of the vehicle into the passenger compartment 87.

<Electric Device>

Figure 4:
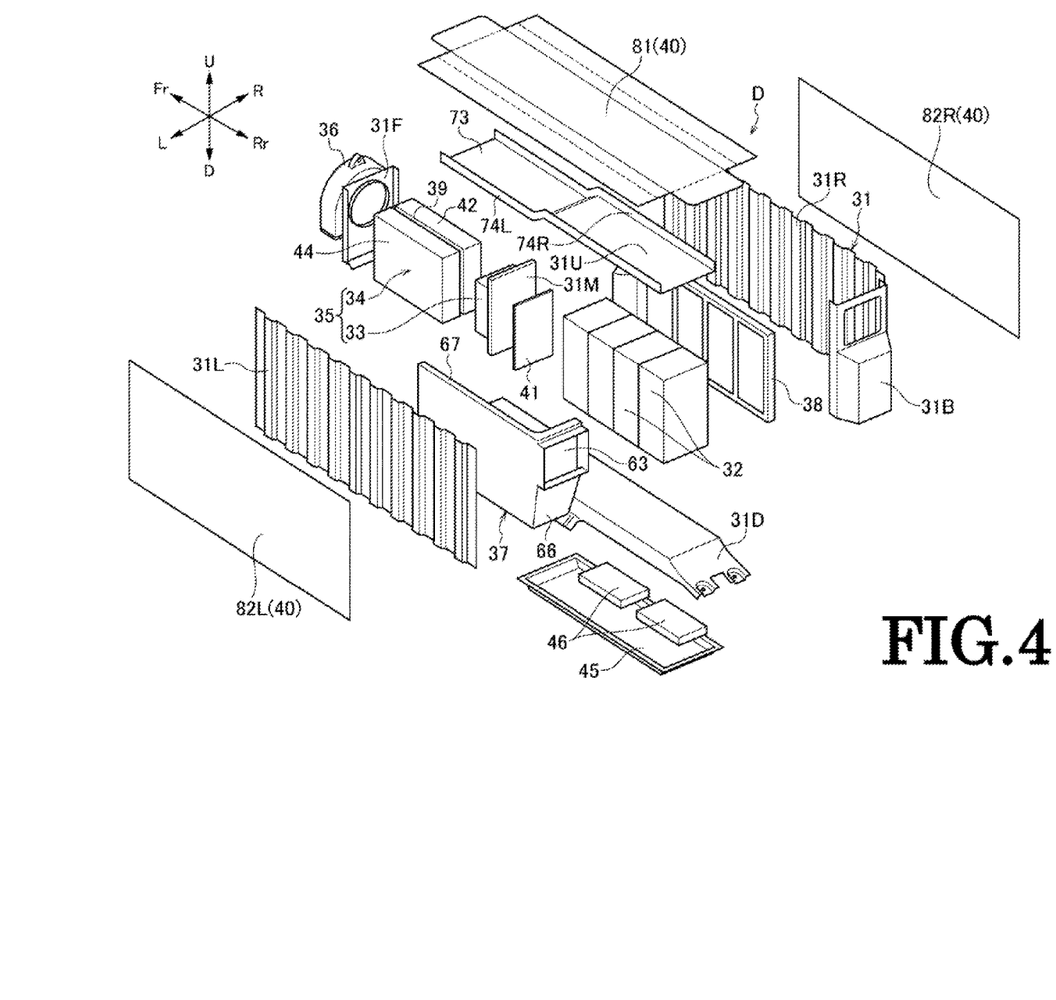
FIG. 4 is an exploded perspective view of an electric device accommodated in the center console.

Next, the electric device D accommodated in the center console 30 will be described in detail by reference to FIGS. 3 and 4. FIG. 4 is an exploded perspective view of the electric device D.

The electric device D includes high-voltage batteries 32, an ECU 41, and high-voltage system equipment 35, and these high-voltage batteries 32, ECU 41, and high-voltage system equipment 35 are made into a unit by being supported by a frame member 31. The frame member 31 has a rectangular parallelepiped shape and is made up as a result of an upper frame member 31U, a lower frame member 31D, and a middle frame member 31M which joins the upper frame member 31U and the lower frame member 31D together being surrounded by a front cover member 31F, a left cover member 31L, a right cover member 31R and a rear cover member 31B. Elements making up corner portions of the frame member 31 are joined together with an arbitrary means such as bolt fastening or spot welding. The joint portions may be such that the elements are tightly secured to each other without a gap along a full length of the joined portion or may include a gap between the joined elements.

The high-voltage batteries 32, the ECU 41, and the high-voltage equipment 35 are disposed sequentially in this order from the rear of the vehicle. The high-voltage system equipment 35 includes a junction box 33 which is attached to a front surface of the middle frame member 31M, and a converter (PCU) 34 which is disposed ahead of the junction box 33 to convert the voltages of the high-voltage batteries 32. A reactor, not shown, is provided in the junction box 33 to suppress a ripple current to thereby reduce a noise to be generated, and constituent elements which constitute a noise generating source are covered by a cover member, not shown. The ECU 41 described above is attached to a rear surface of the middle frame member 31M. The converter (PCU) 34 includes a DC-DC converter 42 and an inverter 44, and these DC-DC converter 42 and inverter 44 are disposed transversely side by side in a space defined between the front cover member 31F and the junction box 33.

An intake duct 37 is attached to left side surfaces of the high-voltage batteries 32 to be disposed between the high-voltage batteries 32 and the left cover member 31L, and a discharge duct 38 is attached to right side surfaces of the high-voltage batteries 32 to be disposed between the high-voltage batteries 32 and the right cover member 31R. Cell voltage sensors (CVS) 46 are fixed to a lower surface of the lower frame member 31D and are covered by a CVS cover 45. The electric device D is fixed to the center tunnel 12 as a result of the lower frame member 31D being fastened to the center tunnel 12 with bolts. The cooling fan 36 is attached to the front surface of the front cover member 31F. Air taken in from the intake grille 56 of the center console 30 by the cooling fan 36 passes sequentially through the intake duct 37, the high-voltage batteries 32, and the discharge duct 38 in that order, then passes from the discharge duct 38 through a cooling passageway 39 defined between the DC-DC converter 42 and the inverter 44, and is then sucked by the cooling fan 36 to be discharged into a discharge flow path 80F from the cooling fan 36. The discharge flow path 80F is a flow path which discharges cooling air discharged from the cooling fan 36 into the passenger compartment 87 through side trims. Since the discharge flow path 80F is not related directly to the invention, the detailed description thereof will be omitted here.

<Interior Construction of Center Console>

Figure 5:
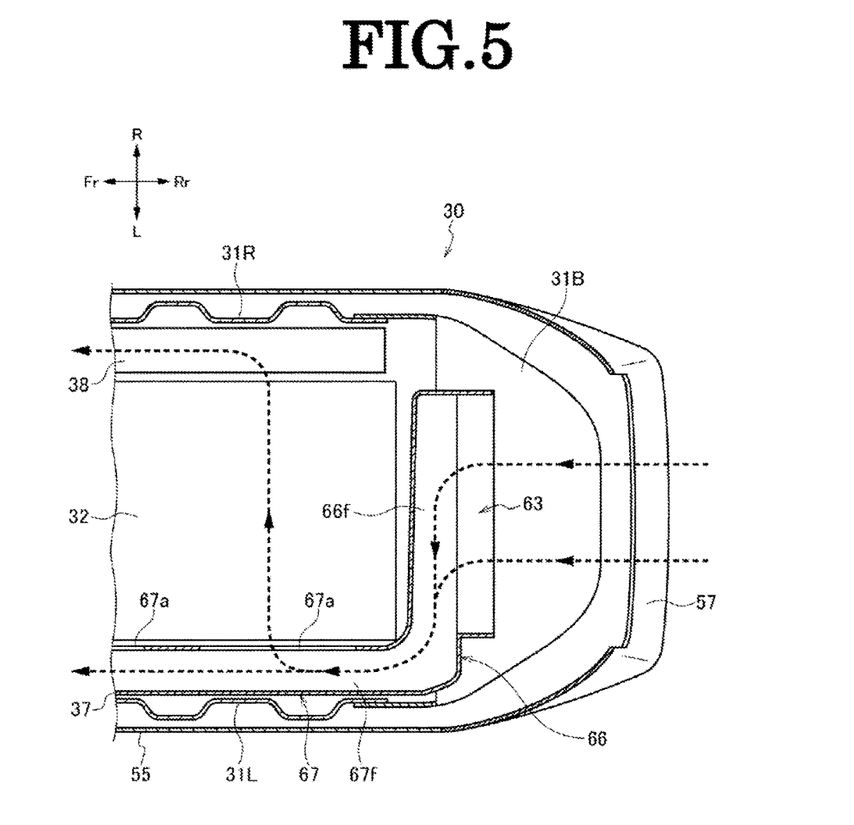
FIG. 5 is a sectional view taken along a line B-B in FIG. 3.

Next, referring to FIGS. 3 to 5, an interior construction of the center console 30 will be described. FIG. 5 is a sectional view taken along a line B-B in FIG. 3. In addition to the electric device D, a maintenance and inspection switch 61, an air conditioning duct 71 and a soundproofing member 40 are accommodated in the center console 30.

The maintenance and inspection switch 61 is provided in the vicinity of the floor panel 11 of the vehicle 10 below the intake grill 56 in a space defined between the cover member 57 provided at a rear portion of the center console 30 and the electric device D. The maintenance and inspection switch 61 is a device configured to shut off circuits connecting to the high-voltage batteries 32 so as to allow maintenance work to be performed safely on the electric device D including the high-voltage batteries 32 when such maintenance work is required.

The air conditioning duct 71 is disposed in a space S which is defined between the upper frame member 31U and a top surface of the center console 30 (an upper surface of the external cover 55) and extend in the front-rear direction within the space S. Namely, the air conditioning duct 71 is provided above the high-voltage batteries 32 via part of the soundproofing member 40, which will be described later, and one end of the air conditioning duct 71 which is situated forward is connected from the center console 30 to the air conditioner (not shown). An opening portion 71a which makes up the other end of the air conditioning duct 71 is opened towards the air conditioning discharge grill 58 which is provided in the upper portion of the inclined surface 57a of the cover member 57. Cool air supplied from the air conditioner is guided from the front to the rear by the air conditioning duct 71 and is then discharged from the air conditioning discharge grill 58 into the passenger compartment 87.

The intake duct 37 (refer to FIG. 4) described above is attached to the left side surfaces of the high-voltage batteries 32 disposed inside the center console 30 to be disposed between the high-voltage batteries 32 and the left cover member 31L. To describe this in greater detail, the intake duct 37 is such that an intake portion 66 which is disposed to lie opposite to the cover member 57 and an air guide portion 67 which is disposed on the left side surfaces of the high-voltage batteries 32 are integrated with each other so as to form substantially an L-shape as seen from thereabove. Flow paths 66f, 67f are formed in interiors of the intake portion 66 and the air guide portion 67, respectively, by two opposite thin plates. An opening portion 63 is provided in an upper half portion of the intake portion 66 so as to be opened towards the intake grill 56 provided in the inclined surface 57a of the cover member 57, and a plurality of communication hoes 67a are provided in a surface of the air guide portion 67 which lies opposite to the high-voltage batteries 32. Due to this, as indicated by dotted lines in FIG. 5, air taken in from the intake grill 56 is guided from the opening portion 63 of the intake duct 37 through the flow path 66f formed in the intake portion 66 to the flow path 67f formed in the air guide portion 67. The cool air guided into the flow path 67f is supplied from the communication holes 67a to the high-voltage batteries 32 and flows into the discharge duct 38 after cooling the high-voltage batteries 32.

In the center console 30 configured in the way described above, when the cooling fan 36 is activated, air inside the passenger compartment 87 is taken into the intake duct 37 through the intake grill 56, while cool air supplied from the air conditioner is discharged from the air conditioning discharge grill 58 which is disposed above the intake grill 56 so as to lie adjacent thereto. The cool air discharged from the air conditioning discharge grill 58 into the passenger compartment 87 is caused to flow downwards due to convection produced by a difference in temperature between the temperature of the air inside the passenger compartment 87 and the temperature thereof, part of which is then taken in from the intake grill 56. Namely, part of the cool air whose temperature has not yet been raised is taken into the intake duct 37. As a result, the high-voltage batteries 32 are cooled effectively. Since the air conditioning duct 71 through which cool air flows is provided above the high-voltage batteries 32, the high-voltage batteries 32 are also cooled through a heat exchange between the high-voltage batteries 32 and the air conditioning duct 71.

<Soundproofing Member>

Figure 6:
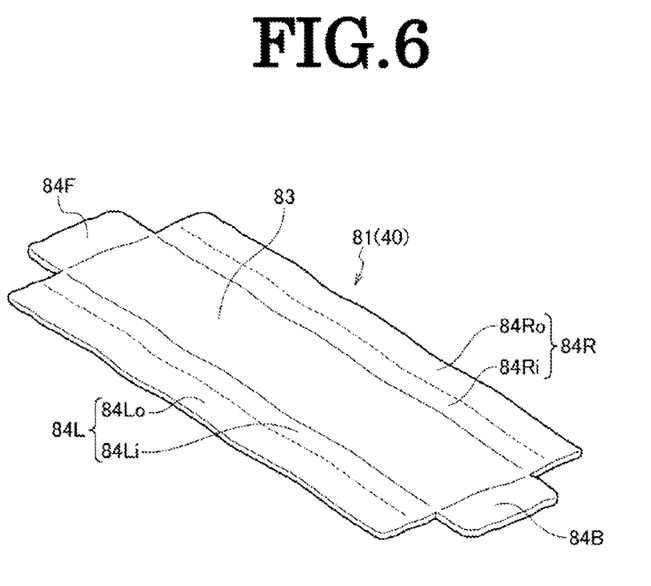
FIG. 6 is a perspective view of an upper soundproofing member.
Figure 7:
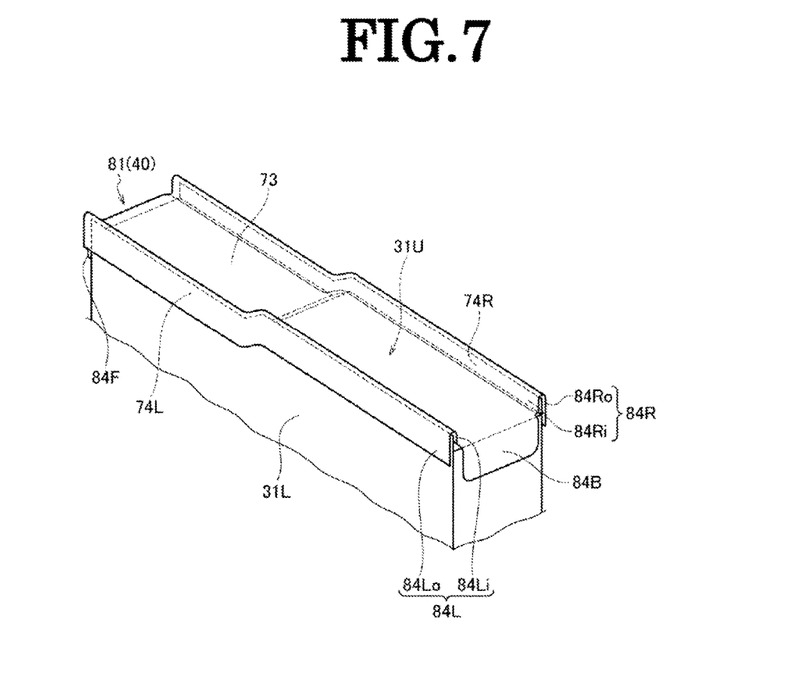
FIG. 7 is a perspective view showing a state where the upper soundproofing member is attached on to the electric device.

Next, referring to FIGS. 4, 6 and 7, the soundproofing member 40 will be described. FIG. 6 is a perspective view of an upper soundproofing member, and FIG. 7 is a perspective view showing a state where the upper soundproofing member is attached to the electric device D.

An upper soundproofing member 81, a left soundproofing member 82L, and a right soundproofing member 82R are provided in the interior of the center console 30 as the soundproofing member 40 for suppressing the transmission of a noise generated by the electric device D to a passenger. These soundproofing members are made of, for example, a sheet of nonwoven fabric. It is more preferable to use a sheet of nonwoven fabric into which a sound absorbing member and a heat insulating member are integrated or a sheet of nonwoven fabric in which a sound absorbing member and a heat insulating member are laminated together. For example, a sheet of nonwoven fabric can be used into which polypropylene microfibers of a fiber diameter of about 1 to 5 μm and polyester short fibers of a fiber diameter of about 20 to 30 μm which are both made by a melt-blown method are integrated. It is possible to suppress effectively the transmission of noise generated in the electric device D and heat generated in the electric device D to a passenger since the soundproofing member has both a soundproofing (sound absorbing) function and a heat insulating function in the way described above.

The upper soundproofing member 81 is provided between the upper frame member 31U and the top surface of the center console 30 (the upper surface of the external cover 55), more specifically, between the upper frame member 31U and the air conditioning duct 71. In the upper frame member 31U, a left vertical wall 74L and right vertical wall 74R are erected on both sides of a rectangular top plate 73, and hence, the upper frame member 31 has substantially a U-shape when seen from the front-rear direction. Stays for holding the air conditioning duct 71 are attached to the left vertical wall 74L and the right vertical wall 74R.

In the upper soundproofing member 81, a front projecting portion 84F, a rear projecting portion 84B, a left projecting portion 84L, and a right projecting portion 84R project forwards, rearwards, leftwards, and rightwards, respectively, from a flat surface portion 83 which covers the top plate 73. The left projecting portion 84L has a left inner projecting portion 84Li which covers an inner side of the left vertical wall 74L and a left outer projecting portion 84Lo which covers an outer side of the left vertical wall 74L, and the right projecting portion 84R has a right inner projecting portion 84Ri which covers an inner side of the right vertical wall 74R and a right outer projecting portion 84Ro which covers an outer side of the right vertical wall 74R.

By installing the upper soundproofing member 81 which is configured in the way described above on the upper frame member 31U, in the rectangular parallelepiped frame member 31, the top plate 73 of the upper frame member 31U is covered by the flat surface portion 83, a joint portion between the upper frame member 31U and the front cover member 31F is covered by the front projecting portion 84F, a joint portion between the upper frame member 31U and the rear cover member 31B is covered by the rear projecting portion 84B, a joint portion between the upper frame member 31U and the left cover member 31L is covered by the left projecting portion 84L, and a joint portion between the upper cover member 31U and the right cover member 31R is covered by the right projecting portion 84R.

The left soundproofing member 82L is sized so as to cover substantially a whole surface of the left cover member 31L and is provided between the left cover member 31L and a left side surface of the center console 30. Similarly, the right soundproofing member 82R is sized so as to cover substantially a whole surface of the right cover member 31R and is provided between the right cover member 31R and a right side surface of the center console 30.

The upper soundproofing member 81, the left soundproofing member 82L, and the right soundproofing member 82R may be formed integrally, or they may be formed separately as done in this embodiment. In addition, the upper sound proofing member 81, the left sound proofing member 82L, and the right soundproofing member 82R may each be divided into a plurality of pieces. For example, the upper soundproofing member 81 may be divided into a front upper soundproofing member which covers a front part of the top plate 73 which is situated forwards of an inclined portion which is provided substantially at a center of the top plate 73 and a rear upper soundproofing member which covers a rear part which is situated rearwards of the inclined portion.

The upper sound proofing member 81, the left soundproofing member 82L, and the right soundproofing member 82R can be held to the corresponding elements of the frame member 31 by an arbitrary means such as attaching, bonding and clipping.

Thus, as has been described heretofore, according to the vehicle 10 of this embodiment, since the sheet-like upper soundproofing member 81 is disposed between the upper surface of the electric device D and the center console 30, the transmission of noise generated in the electric device D to a passenger can be suppressed effectively. The sheet-like upper soundproofing member 81 is easy to be handled and can hence be built on the upper surface of the electric device D easily.

Since the upper soundproofing member 81 is the integral member or the laminated member of the sound absorbing member and the heat insulating member, the transmission of noise generated in the electric device D and heat generated in the electric device D to a passenger can be suppressed effectively. In particular, in the case where the air conditioning duct 71 is provided above the electric device D, in the event that there is a great temperature deference between the electric device D and the air conditioning duct 71, it is considered that condensation occurs on the air conditioning duct 71. However, such condensation on the air conditioning device 71 can be suppressed as a result of the upper soundproofing member 81 doubling as the heat insulating member. Additionally, it is possible to prevent a ground fault due to condensation.

The upper soundproofing member 81 has the front projecting portion 84F which covers the joint portion between the upper frame member 31U and the front cover member 31F, the rear projecting portion 84B which covers the joint portion between the upper frame member 31U and the rear cover member 31B, the left projecting portion 84L which covers the joint portion between the upper frame member 31U and the left cover member 31L, and the right projecting portion 84R which covers the joint portion between the upper frame member 31U and the right cover member 31R. Therefore, it is possible to shut out the noise of the electric device D which leaks out of the joint portions of the frame member 31 in an ensured fashion.

In the left projecting portion 84L and the right projecting portion 84R, extending portions which extend in the left-right direction may further be provided at both left and right end portions of the left outer projecting portion 84Lo and the right outer projecting portion 84Ro. By doing so, in installing the upper soundproofing member 81 on the upper frame member 31U, the extending portions are folded back inwards so as to cover at least end portions of anyone of the left inner projecting portion 84Li, the right inner projecting portion 84Ri, the front projecting portion 84F and the rear projecting portion 84B or at least end portions of all of those projecting portions, whereby noise of the electric device D which leaks out of gaps in the joint portions of the frame member 31 can be shut inside in a more ensured fashion.

Since the left soundproofing member 82L and the right soundproofing member 82R which are integral with or separate from the upper soundproofing member 81 are disposed between a left side surface of the electric device D, and the center console 30 and a right side surface of the electric device D and the center console 30 respectively, it is possible to prevent noise generated on the periphery of the electric device D from being transmitted to a passenger.

The invention is not limited to the embodiment that has been described above and hence can be modified or improved as required. For example, in the embodiment described above, the electric device D is described as including the high-voltage batteries 32, the ECU 41, and the high-voltage system equipment 35. However, the invention is not limited thereto, and hence, the electric device D should be configured to include any one of the high-voltage batteries 32, the ECU 41, and the high-voltage system equipment 35.

In addition, the center tunnel 12 may be formed only by the floor panel 11 or an integrally formed part in which the floor panel 11 is covered by the center tunnel cover.

This patent application is based on Japanese Patent Application (No. 2014-229001) filed on Nov. 11, 2014, the contents of which are incorporated herein by reference.

DESCRIPTION OF REFERENCE NUMERALS AND CHARACTER

10 Vehicle
14L Left front seat (front seat)
14R Right front seat (front seat)
30 Center console
31 Frame member
31B Rear cover member (side panel)
31F Front cover member (side panel)
31L Left cover member (side panel)
31R Right cover member (side panel)

31U Upper frame member (upper panel)
32 High-voltage battery
35 High-voltage system equipment
71 Air conditioning duct
81 Upper soundproofing member
82L Left soundproofing member
82R Right soundproofing member
84B Rear projecting portion
84F Front projecting portion
84L Left projecting portion
84R Right projecting portion
D Electric device

The invention claimed is:

1. A vehicle comprising:
an electric device;
a left front seat and a right front seat; and
a center console which is disposed between the left front seat and the right front seat, and which accommodates the electric device, wherein
a sheet-shaped soundproofing member is disposed between an upper surface of the electric device and the center console,
wherein the soundproofing member is made up by integrating or laminating a noise absorbing member and a heat insulating member.

2. The vehicle according to claim 1, wherein
the electric device is held by a frame member having a rectangular parallelepiped shape and includes at least one of a high-voltage battery and a high-voltage system equipment, and wherein
the soundproofing member has projecting portions which cover joint portions between an upper panel and side panels which make up the frame member.

3. The vehicle according to claim 1, wherein
an air conditioning duct which connects to an air conditioner is provided in the center console, and wherein the air conditioning duct is provided above the soundproofing member.

4. The vehicle according to claim 1, wherein
other soundproofing members which are integral with or separate from the soundproofing member are disposed between a left side surface and the center console and between a right side surface of the electric device and the center console respectively.

5. A vehicle comprising:
an electric device;
a left front seat and a right front seat; and
a center console which is disposed between the left front seat and the right front seat, and which accommodates the electric device, wherein
a sheet-shaped soundproofing member is disposed between an upper surface of the electric device and the center console,
wherein the electric device is held by a frame member having a rectangular parallelepiped shape and includes at least one of a high-voltage battery and a high-voltage system equipment, and
wherein the soundproofing member has projecting portions which cover joint portions between an upper panel and side panels which make up the frame member.

6. The vehicle according to claim 5, wherein
an air conditioning duct which connects to an air conditioner is provided in the center console, and wherein the air conditioning duct is provided above the soundproofing member.

7. The vehicle according to claim 5, wherein
other soundproofing members which are integral with or separate from the soundproofing member are disposed between a left side surface and the center console and between a right side surface of the electric device and the center console respectively.

* * * * *